United States Patent
Chen et al.

(10) Patent No.: US 7,598,680 B2
(45) Date of Patent: Oct. 6, 2009

(54) ELECTRONIC POWER PROTECTION CIRCUIT AND APPLICATIONS THEREOF

(75) Inventors: Chao Chen, Shanghai (CN); Rui-Xia Fei, Shanghai (CN)

(73) Assignee: BCD Semiconductor Manufacturing Limited, Grand Cayman (KY)

( * ) Notice: Subject to any disclaimer, the term of this patent is extended or adjusted under 35 U.S.C. 154(b) by 122 days.

(21) Appl. No.: 11/652,696

(22) Filed: Jan. 12, 2007

(65) Prior Publication Data

US 2008/0055798 A1    Mar. 6, 2008

(30) Foreign Application Priority Data

Aug. 29, 2006    (CN) .................... 2006 2 0133165 U (51) Int. Cl.
*G05F 1/00*    (2006.01)

(52) U.S. Cl. .................... 315/291; 315/307; 363/21.01; 363/50; 363/74

(58) Field of Classification Search ............. 315/209 R, 315/276, 291, 307, 245, 361; 363/20, 21.11, 363/19, 21.01, 50, 56.1, 56.11, 73, 74
See application file for complete search history.

(56) References Cited

U.S. PATENT DOCUMENTS

| | | | | |
|---|---|---|---|---|
| 4,037,271 A | * | 7/1977 | Keller | 363/21.07 |
| 4,047,235 A | * | 9/1977 | Davis | 361/100 |
| 5,952,793 A | * | 9/1999 | Nishi et al. | 315/307 |
| 7,088,598 B2 | * | 8/2006 | Yang et al. | 363/21.01 |
| 7,099,163 B1 | * | 8/2006 | Ying | 363/21.11 |
| 7,221,128 B2 | * | 5/2007 | Usui et al. | 323/207 |

* cited by examiner

*Primary Examiner*—Douglas W Owens
*Assistant Examiner*—Jimmy T Vu
(74) *Attorney, Agent, or Firm*—Muncy, Geissler, Olds & Lowe, PLLC (57) ABSTRACT

An electric power protection circuit connected in series to a secondary side circuit of a transformer in a switch mode power supply includes a voltage/current limiting device to get an electric power signal output from the secondary side circuit of the transformer that goes through current and voltage limitation before being output and a constant current/voltage controller to get the electric power signal which has the current and voltage limited by the voltage/current limiting device. The electric power signal further is undergone constant voltage/current control to achieve voltage overshoot protection.

6 Claims, 7 Drawing Sheets

ELECTRONIC POWER PROTECTION CIRCUIT AND APPLICATIONS THEREOF

FIELD OF THE INVENTION

The present invention relates to an electric power protection circuit and applications thereof and particularly to an electric power protection circuit adopted for use on a switch mode power supply and a power supply using the electric power protection circuit.

BACKGROUND OF THE INVENTION

Figure 1:
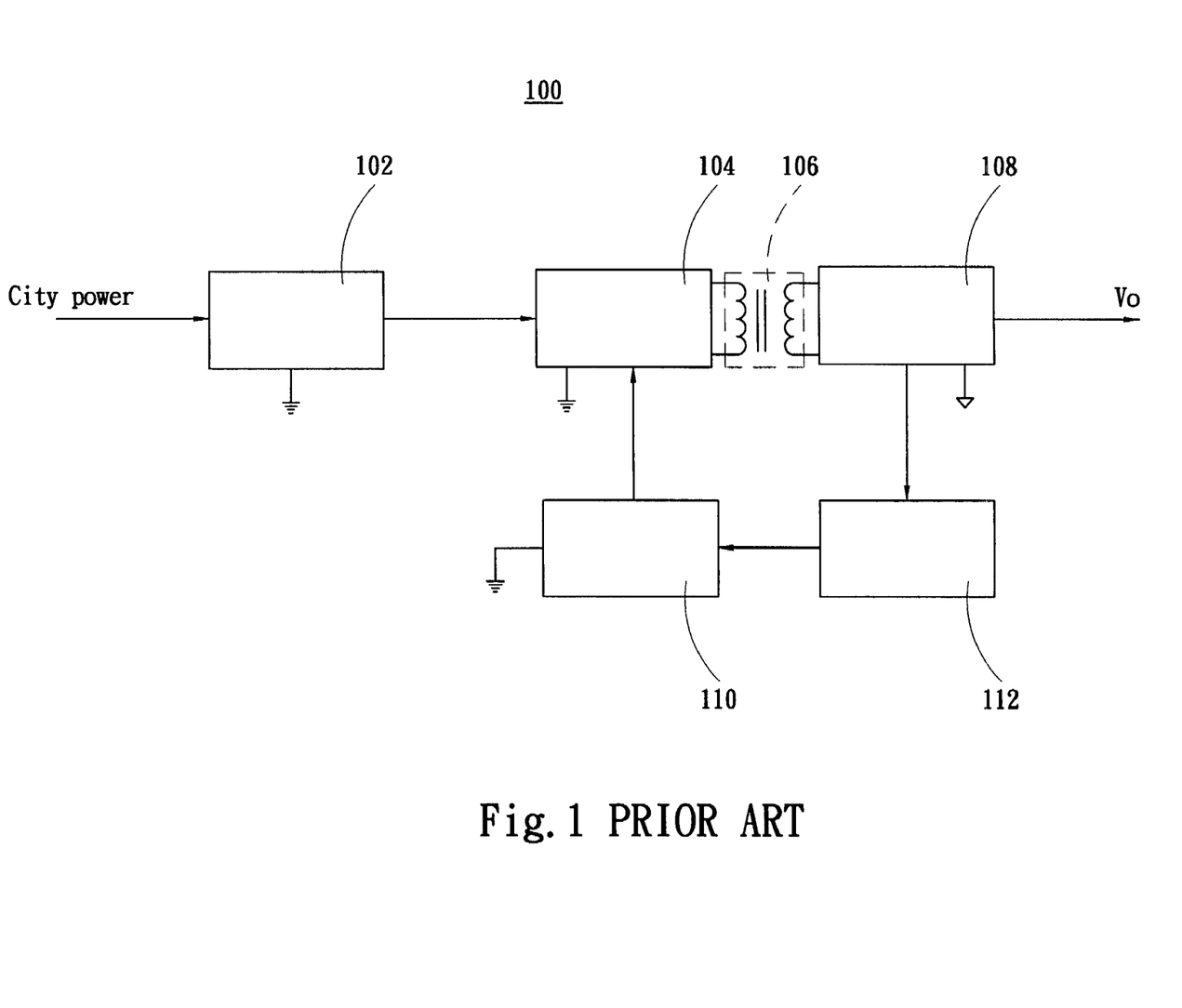
FIG. 1 is a block diagram of a conventional switch mode power supply.

The present chargers for handsets and digital cameras mostly adopt a switch mode power supply. Such a charger has a PWM controller on the primary side of a transformer to control electric power according a feedback signal. The secondary side of the transformer has a dual processing amplifier circuit to provide a constant current and a voltage base circuit to provide a constant voltage, or a transistor to provide the constant current and a voltage base circuit to provide the constant voltage. However in order to save cost, in practice the feedback signal end of the PWM controller and the power supply end are coupled together. Refer to FIG. 1 for a block diagram of a conventional switch mode power supply 100. It includes a commutation filter device 102 to receive electric power from a city power and perform electric power rectification and filtering, a power switch 104 which is electrically connected to the commutation filter device 102, a transformer 106 which has a primary side electrically connected to the power switch 104, an output commutation filter device 108 which is electrically connected to a secondary side of the transformer 106, a PWM control device 110 to get a feedback signal and electric power from the output commutation filter device 108 through a coupling element 112 and output an electric power signal to the power switch 104. The PWM control device 110 and the coupling element 112 form a feedback circuit.

While the PWM controller gets the feedback signal and electric power from the same input end and can save cost, it does not provide voltage overshoot protection function. Hence how to provide an electric power protection circuit for a switch mode power supply is a big issue in the electronic industry.

SUMMARY OF THE INVENTION

The primary object of the present invention is to provide an electric power protection circuit and a switch mode power supply that adopts the electric power protection circuit.

The electric power protection circuit according to the invention is connected in series to a secondary side circuit of a transformer in a switch mode power supply. It includes a voltage/current limiting device to get an electric power signal output from a secondary side circuit of a transformer in the power supply that goes through current/voltage limitation before being output, and a constant current/voltage controller to get an electric power signal after the current/voltage limitation and perform constant voltage/current control on the electric power signal to protect electric power.

The invention also provides a switch mode power supply that includes a commutation filter device to receive electric power from a city power and perform rectification and filtering before delivering the electric power, a power switch to receive the electric power output from the commutation filter device, a transformer having a primary side connecting to the power switch, an output commutation filter device to receive electric power output from a secondary side of the transformer that is rectified and filtered before being output, a voltage/current limiting device to get the electric power output from the output commutation filter device that undergoes voltage/current limitation before being output, a constant current/voltage controller to get the electric power output from the voltage/current limiting device and perform constant current/voltage control of electric power signals, and a PWM control device to get the electric power signals from the constant current/voltage controller through an optical coupling element and output to the power switch to control ON and OFF of the power switch. The voltage/current limiting device, constant current/voltage controller and the PWM control device form a feedback circuit.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 3A:
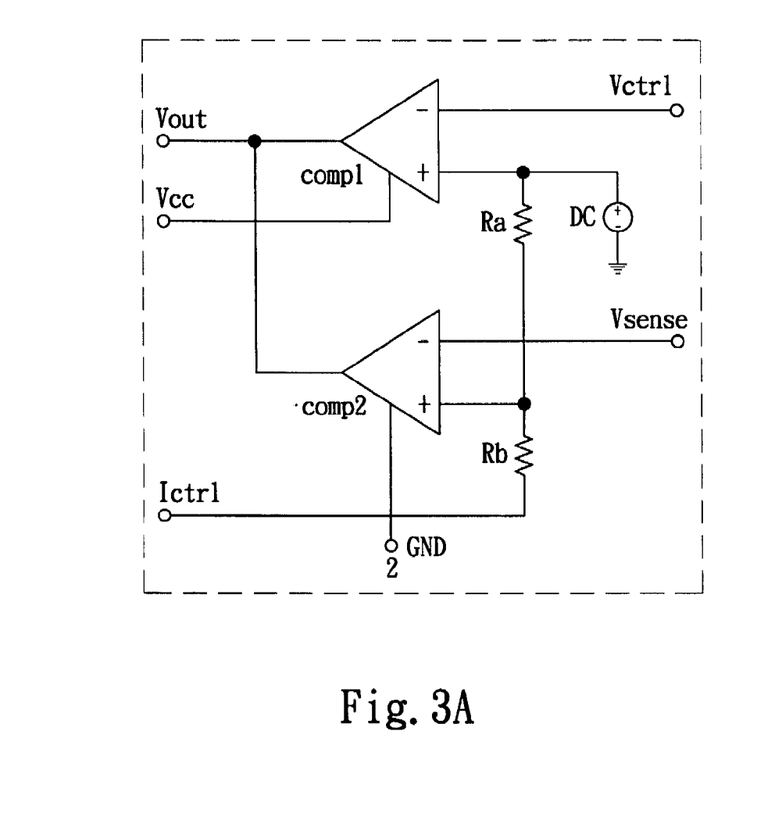
FIG. 3A is a circuit diagram of a first embodiment of the invention for a constant current/voltage controller.
Figure 3B:
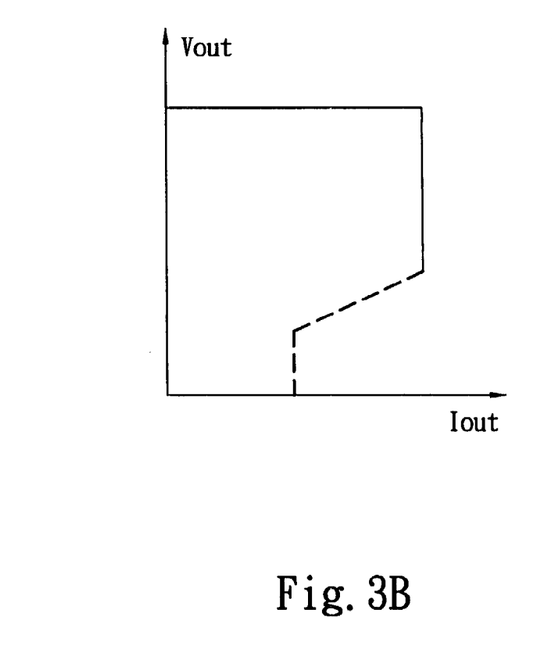
FIG. 3B is a chart showing the electric curve of the first embodiment of the invention for constant current/voltage controller.

Please refer to FIGS. 3A and 3B for the circuit diagram and electric curve of a first embodiment of the invention for a constant current/voltage controller. The constant current/voltage controller includes:

a first comparator comp1 has a negative input end forming a constant voltage control end Vctrl, a positive input end connecting to a voltage source DC and an output end to output a constant voltage control signal Vout; Vcc and GND are power supplies to comp1.

a second comparator comp2 which has a negative input end forming a constant current control end Vsense and a positive input end to get electric power from the voltage source DC through a voltage dividing circuit. The voltage dividing circuit consists of two resistors Ra and Rb. The positive input end of the second comparator comp2 is connected to a first output end (between Ra and Rb) of the voltage dividing circuit. The voltage source DC is connected to another end of the resistor Ra. The second comparator comp2 has an output end connecting to the output end of the first comparator comp1 to output the constant voltage control signal Vout. Vcc and GND are power supplies to comp2. The voltage dividing circuit has a second output (input) end (another end of the resistor Rb) to output (input) a constant current control signal Ictrl.

A voltage/current limiting device (namely a diode in this embodiment) is provided that has a positive electrode connecting to the constant voltage control end Vctrl of the constant current/voltage controller to form a constant voltage feedback circuit. The positive electrode of the diode is connected to the constant current control end Vsense of the constant current/voltage controller to form a constant current feedback circuit.

Figure 2:
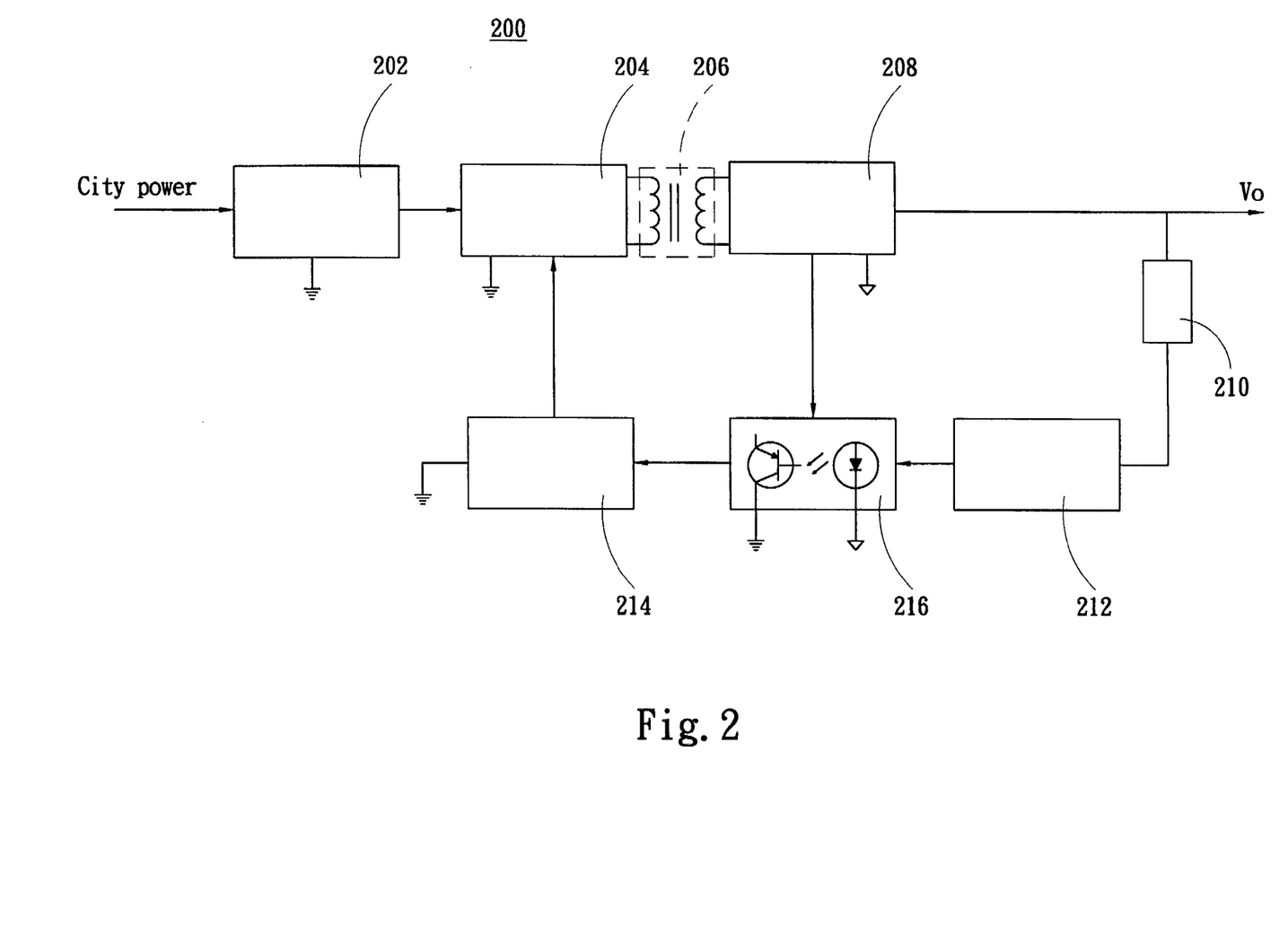
FIG. 2 is a circuit block diagram of a second embodiment of the invention for a switch mode power supply.

Refer to FIG. 2 for the circuit block diagram of a second embodiment of the invention for a switch mode power supply 200. It includes:

a commutation filter device 202 to receive electric power from a city power and output the electric power after rectifying and filtering;

a power switch 204 to receive the electric power output from the commutation filter device 202;

a transformer 206 which has a primary side connecting to the power switch 204;

an output commutation filter device 208 to receive the electric power output from a secondary side of the transformer 206 and output the electric power after rectifying and filtering;

a voltage/current limiting device 210 to receive the electric power output from the output commutation filter device 208 and output the electric power after limiting the voltage and current;

a constant current/voltage controller 212 to receive the electric power output from the voltage/current limiting device 210 and perform constant current/voltage control on electric power signals; and a PWM control device 214 to get the electric power signals from the constant current/voltage controller 212 through an optical coupling element 216 and output to the power switch 204 to control ON and OFF of the power switch 204.

The voltage/current limiting device 210, constant current/voltage controller 212, optical coupling element 216 and PWM control device 214 form a feedback circuit.

In this embodiment the voltage/current limiting device 210 is a diode. It has a negative electrode connecting to the output commutation filter device 208 and a positive electrode connecting to the constant current/voltage controller 212.

The operation principle of the switch mode power supply 200 is as follow: when the secondary side detects system output, namely output voltage overshoot of the output commutation filter device 208 occurs, a voltage overshoot signal is sent back to an input end of the constant current/voltage controller 212 which in turn outputs electric power of a lower potential to set on the optical coupling element 216, thereby a feedback signal detection end of the PWM control device 214 gets a higher voltage. When the higher voltage is above the duty threshold voltage of the PWM control device 214, the PWM control device 214 ends the duty mode and outputs electric power at a higher DC potential. The transformer 206 stops energy transmission. The switch mode power supply 200 does not receive energy, and the voltage at the output end does not rise. Hence electric power protection function is accomplished.

The PWM control device 214 of the invention may be a three-end/four-end single blade PWM controller 214 (inner cluster power switch), and may also independent PWM control device 214 and power switch 204.

The voltage/current limiting device 210 adopted in the invention is a voltage stabilization diode and has the following requirements:

a. when the voltage at two ends of the voltage stabilization diode is output voltage, the current flowing through the voltage stabilization diode should be minimized but without affecting system normal output; and b. when the voltage stabilization diode is in operation, the stabilized voltage value is determined through the output voltage. Too high of the stabilized voltage value cannot achieve protection effect.

Figure 4:
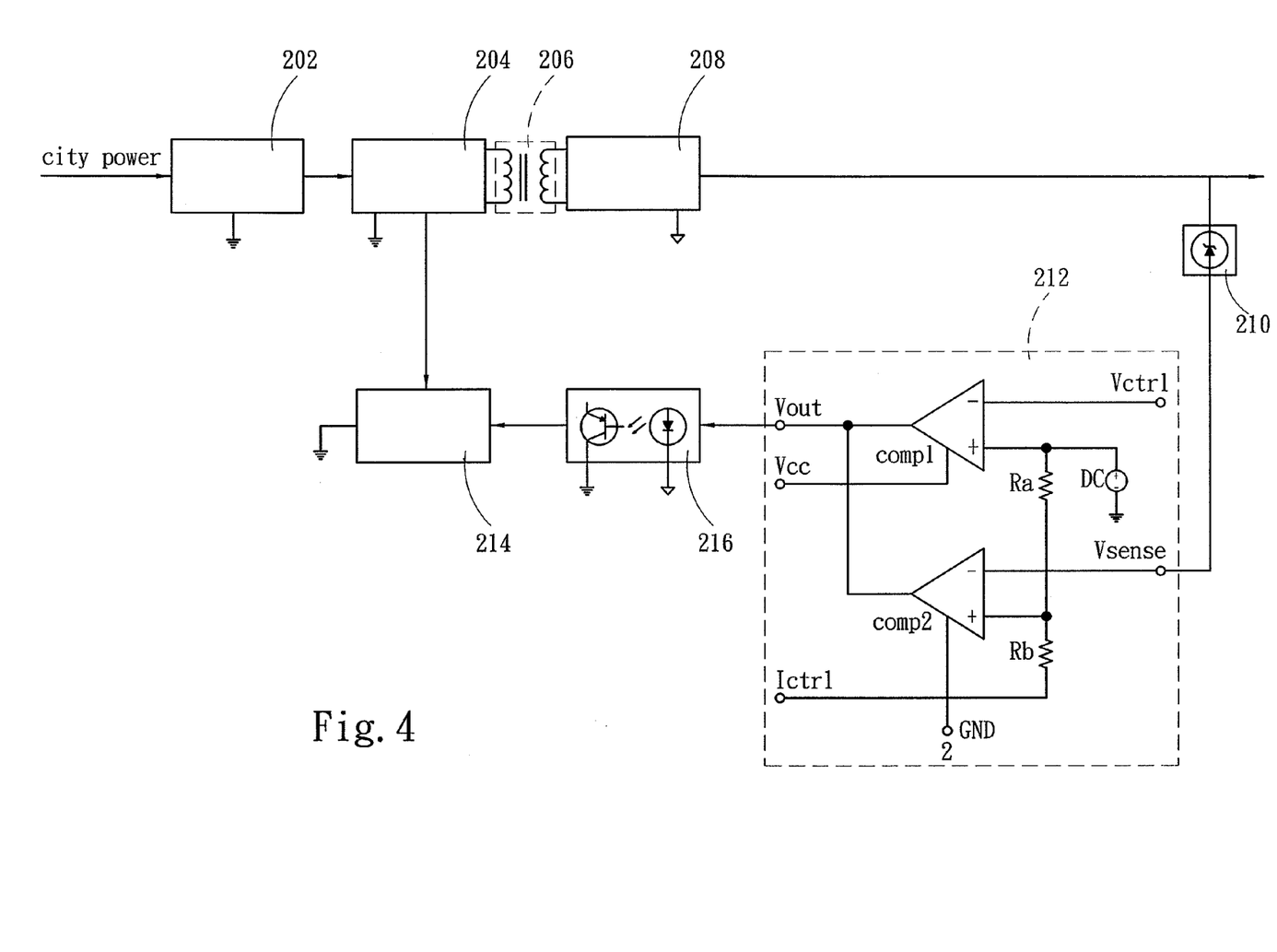
FIG. 4 is a circuit block diagram of a third embodiment of the invention for a constant current feedback circuit.

Refer to FIG. 4 for the circuit block diagram of a third embodiment of the invention for a constant current feedback circuit. The constant current/voltage controller 212 has a constant voltage control end and a constant current control end. Depending on different connections of the current/voltage limiting device (namely diode), a constant current feedback circuit or a constant voltage feedback circuit may be configured. An embodiment structure of the feedback circuit of the switch mode circuit is as follow. The constant current/voltage controller 212 includes:

a first comparator comp1 has a negative input end forming a constant voltage control end Vctrl, a positive input end connecting to a voltage source DC and an output end to output a constant voltage control signal Vout; Vcc and GND are power supplies to comp1. and a second comparator comp2 which has a negative input end forming a constant current control end Vsense and a positive input end connecting to the voltage source DC through a voltage dividing circuit. The voltage dividing circuit consists of resistors Ra and Rb. The positive input end of the second comparator comp2 is connected to a first output end (between Ra and Rb) of the voltage dividing circuit. The voltage source DC is connected to another end of the resistor Ra. The second comparator comp2 has an output end connecting to the output end of the first comparator comp1 to output a constant voltage control signal Vout. Vcc and GND are power supplies to comp2.

The voltage dividing circuit has a second output (input) end (another end of resistor Rb) to output (input) a constant current control signal Ictrl. In this embodiment the feedback circuit is a constant current feedback circuit. The voltage/current limiting device 210 (namely diode) is connected to the constant current control end Vsense of the constant current/voltage controller 212 which has an output end to output a constant voltage control signal Vout to the PWM control device 214 through the optical coupling element 216.

Figure 5:
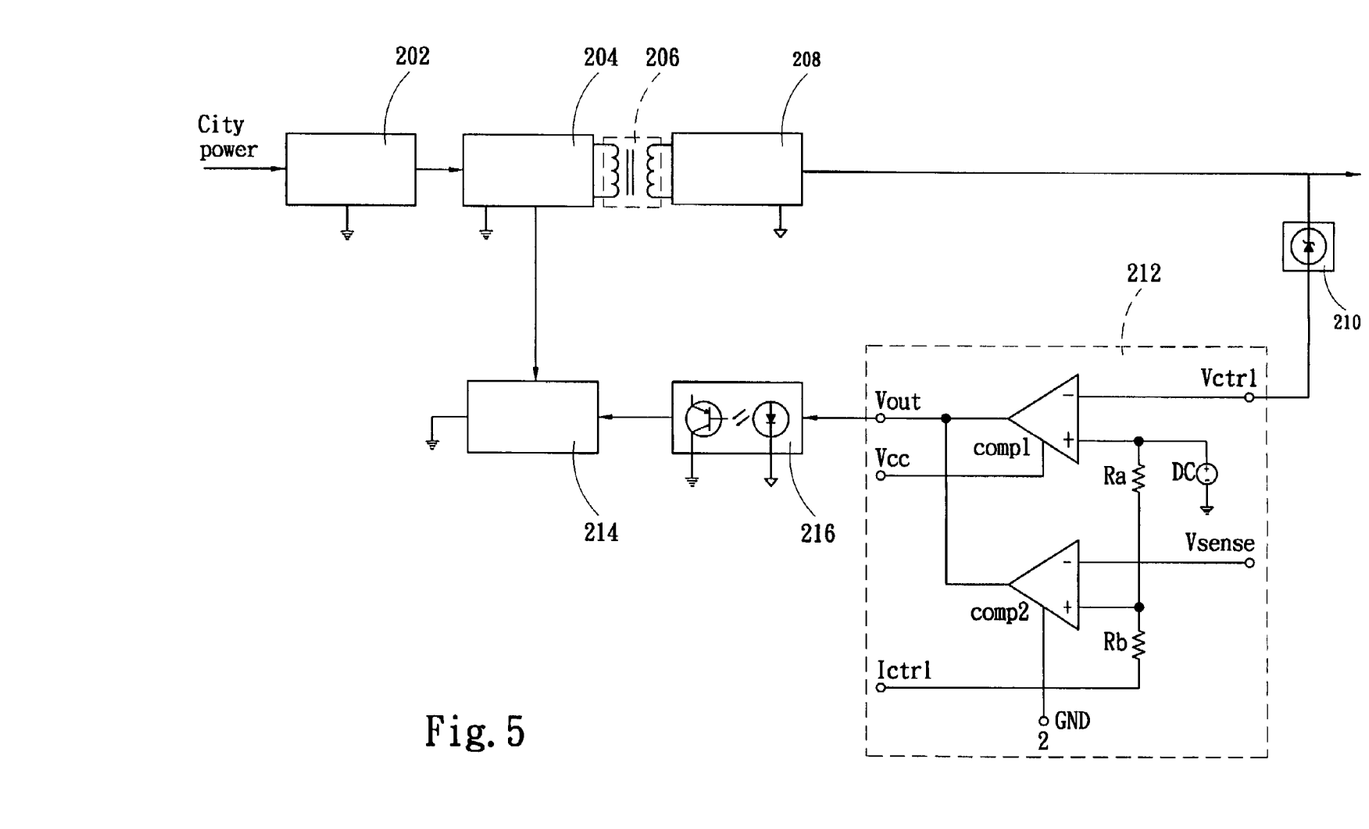
FIG. 5 is a circuit block diagram of a fourth embodiment of the invention for a constant current feedback circuit.

Refer to FIG. 5 for the circuit block diagram of a fourth embodiment of the invention for a constant current feedback circuit. The embodiment structure of the feedback circuit of the switch mode circuit is as follow: It differs from the third embodiment by connecting the voltage/current limiting device 210 (namely diode) to the constant voltage control end Vctrl of the constant current/voltage controller 212 rather than the constant current control end Vsense as the third embodiment does. Hence the feedback circuit being formed is a constant voltage feedback circuit rather than the constant current feedback circuit in the third embodiment. The output end of the constant current/voltage controller 212 outputs a constant voltage control signal Vout to the PWM control device 214 through the optical coupling element 216.

Based on the third and fourth embodiments previously discussed, it is clear that either through the constant voltage feedback or constant current feedback, the switch mode circuit of the invention can feed back a voltage overshoot signal to an input end of the constant current/voltage controller 212 when voltage overshoot of output electric power is detected. Then the constant current/voltage controller 212 outputs electric power of a lower potential to turn on the optical coupling element 216, thereby the voltage at the feedback signal detection end of the PWM control device 214 rises. When the voltage is higher than the duty threshold voltage of the PWM control device 214, the PWM control device 214 ends PWM duty mode and outputs electric power of a higher DC potential. The transformer 206 stops energy transmission operation. The switch mode power supply 200 cannot get energy, and the voltage at the output end does not rise, thus an electric power protection effect can be accomplished.

Figure 6:
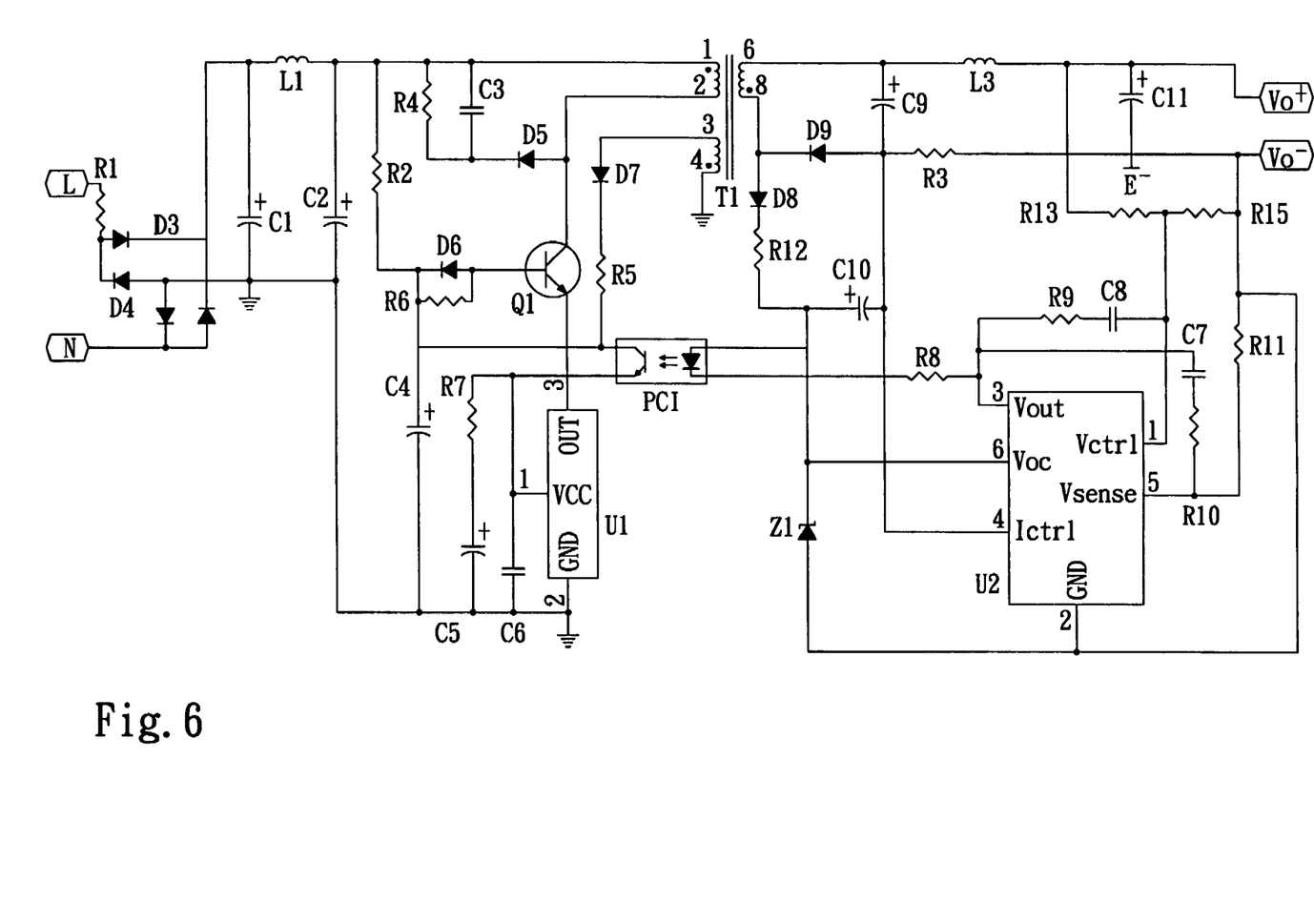
FIG. 6 is a circuit diagram of a fifth embodiment of the invention for a handset charger.

Refer to FIG. 6 for the circuit diagram of a fifth embodiment of the invention for a handset charger. The handset charger adopts the switch mode power supply of the invention and has output of 5 A/1 A.

In this embodiment, U1 is a PWM controller on the primary side of a transformer. After the circuit is power on, and the voltage at VCC end of U1 is lower than the threshold voltage 4.75V of the jumping cycle set in the chipset, U1 is in a PWM mode. On the other hand, when the voltage at the VCC end is higher than 4.75V, U1 out end has a high potential, Q1 cuts off, electric power cannot be transmitted from the primary side of the transformer to the secondary side. U2 is a constant current/voltage controller at the secondary side of the transformer. The internal circuit diagram of U2 is same as previously discussed (referring to FIG. 3A). Constant current control is accomplished through the second comparator comp2 (serving as a process amplifier). Constant voltage control is accomplished through the first comparator comp1 (serving as a process amplifier). In normal conditions, the constant control end Vsense of U2 is at a low potential. The constant current control end Vsense and ground are bridged by a resistor R11 of 510 ohms. The potential at the constant voltage control end Ictrl is (0.2−Io*Rs), where Rs is 0.25 ohm, Io is a load current. Z1 is a Zener voltage stabilization diode used in the invention to serve as the voltage/current limiting device 210. To provide normal output the leakage current of Zener voltage stabilization diode Z1 must be lower than 1 uA at 5V.

During normal operation, the voltage at two ends of Z1 approximates to system output 5V. The current flowing through Z1 is the leakage current, and is 0.3 uA when 7.5V Zener is selected. The voltage at the constant current control end Vsense is 0.153 uV (R11*0.3 uA) and does not affect normal operation. When output voltage overshoot occurs, presumed caused by alteration of feedback resistor R13 or R15, and R13=120 k ohms, and R15=2K ohms, in the event of no protection and through U2 and the feedback resistor R13 and R15, output electric power is 73.81V (1.21*(R13+R15)/R15). After protection of voltage overshoot is included, when the output voltage reaches Z1 piercing voltage, current Iz flowing through Z1 has reached above 0.4 mA, the voltage (R11*Iz>0.2V) at two ends of the resistor R11 is higher enough to make the second comparator comp2 of U2 to output a low potential to set on the optical coupler PC1. VCC end of U1 gets energy from the auxiliary coil of the transformer and rises above the jumping cycle threshold value, the primary coil of the transformer stops transmission of energy, and the secondary coil cannot get energy, output electric power does not increase, hence the voltage stabilization value of Z1 is stabilized. Actual test results are 7.322V (zero loading output) and 7.138V (output loading 0.7 A).

Figure 7:
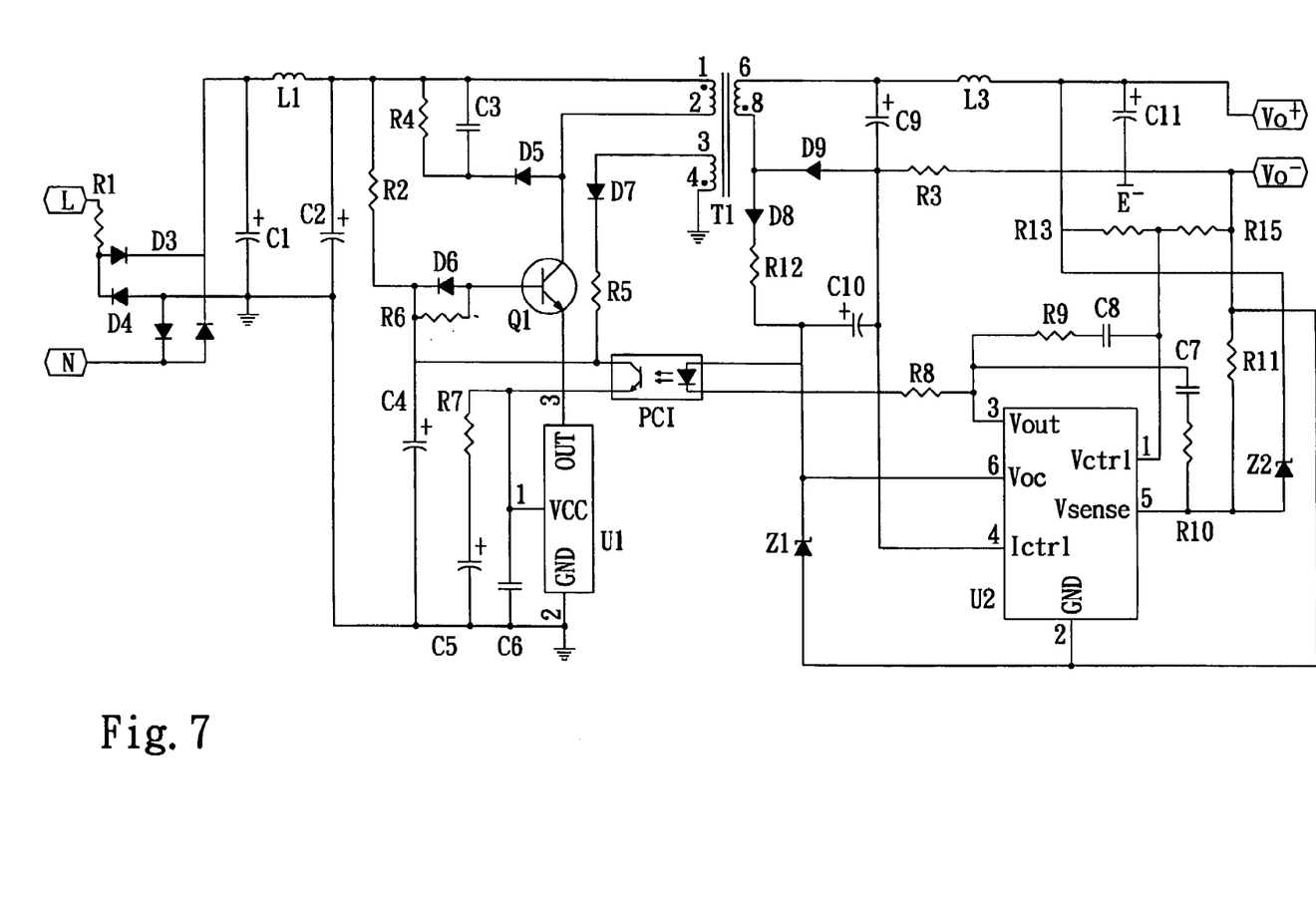
FIG. 7 is a circuit diagram of a sixth embodiment of the invention for a PWM constant current/voltage charger.

Refer to FIG. 7 for the circuit diagram of a sixth embodiment of the invention for a PWM constant current/voltage charger. In this embodiment the negative electrode of Zener voltage stabilization diode Z2 is connected to system output VO+, the positive electrode of Zener voltage stabilization diode Z2 is connected to the constant voltage control end Vctrl of U2. The rated voltage of Z2 is 7.5V. To achieve only constant voltage function, system load is 0.375 A (constant current characteristics are effective when load current is greater than 0.8 A). In the normal operation, system output is 5V, Zener voltage stabilization diode Z2 is OFF, the system is not affected. When output voltage overshoot occurs, presumed caused by alteration of the feedback resistor R13 or R15, presumed R13=6.435 k (=6.8 k//120 k) ohms, R5=0.82 k ohms, system output through U2 and the feedback resistors R13 and R15 under no protection condition is 10.59V (1.21*(R13+R15)/R15). After voltage overshoot protection is included, when output voltage reaches the piercing voltage of Zener voltage stabilization diode Z2, Zener voltage stabilization diode Z2 is set on, voltage Vz at two ends of Zener voltage stabilization diode Z2 is 7.5V, and system output is stabilized at 8.41V (Vz+1.21V) to achieve electric power protection effect.

In short, the switch mode power supply of the invention, whether configured in constant voltage feedback or constant current feedback, can feed back a voltage overshoot signal to an input end of the constant current/voltage controller 212 when detects voltage overshoot occurred to output electric power to make the constant current/voltage controller 212 to output electric power at a lower potential to set on the optical coupling element 216. Thereby the voltage at the feedback signal detection end of the PWM control device 214 is boosted. When the voltage is higher than the duty threshold voltage of the PWM control device 214, the PWM control device 214 ends PWM duty mode to output electric power of a high DC potential, the transformer 206 stops energy transmission, therefore the switch mode power supply 200 cannot get energy and the voltage at the output end does not rise. As a result, electric power protection effect can be accomplished. The invention provides a significant improvement over the conventional techniques.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. An electric power protection circuit coupled in series with a secondary side circuit of a transformer in a switch mode power supply, comprising:
   a voltage/current limiting device to get an electric power signal output from the secondary side circuit of the transformer in the power supply that goes through current and voltage limitation before being output; and
   a constant current/voltage controller to get the electric power signal after having the current and voltage limited by the voltage/current limiting device that is controlled at a constant voltage and a constant current to achieve electric power protection,
   wherein the voltage/current limiting device is a diode and has a negative electrode connecting to an output commutation filter device in the switch mode power supply and a positive electrode connecting to the constant current/voltage controller; and
   wherein the constant current/voltage controller comprises:
   a first comparator which has a negative input end forming a constant voltage control end and a positive input end connecting to a voltage source and an output end delivering a constant voltage control signal; and
   a second comparator which has another negative input end forming a constant current control end and another positive input end connecting to the voltage source through a voltage dividing circuit, and another output end connecting to the output end of the first comparator to output a constant voltage control signal; the another positive input end connecting to a first output end of the voltage dividing circuit which has a second output (input) end to output (input) a constant current control signal.

2. The electric power protection circuit of claim 1, wherein the diode has a positive electrode connecting to the constant current control end of the constant current/voltage controller to form a constant current feedback circuit.

3. The electric power protection circuit of claim 1, wherein the diode has a positive electrode connecting to the constant voltage control end of the constant current/voltage controller to form a constant voltage feedback circuit.

4. A switch mode power supply, comprising:
a commutation filter device to receive electric power from a city power and output the electric power after rectifying and filtering;
a power switch to receive the electric power output from the commutation filter device;
a transformer having a primary side connecting to the power switch;
an output commutation filter device to get electric power output from a secondary side of the transformer and output the electric power after rectifying and filtering;
a voltage/current limiting device to receive the electric power from the output commutation filter device that goes through current and voltage limitation before being output;
a constant current/voltage controller to get the electric power from the voltage/current limiting device and perform constant voltage/current control on electric power signals; and
a PWM control device to receive the electric power signals from the constant current/voltage controller through an optical coupling element to output to the power switch to control ON and OFF of the power switch;
wherein the voltage/current limiting device, the constant current/voltage controller, optical coupling element and the PWM control device form a feedback circuit,
wherein the voltage/current limiting device is a diode and has a negative electrode connecting to the output commutation filter device and a positive electrode connecting to the constant current/voltage controller; and
wherein the constant current/voltage controller comprises:
a first comparator which has a negative input end forming a constant voltage control end and a positive input end connecting to a voltage source and an output end delivering a constant voltage control signal; and
a second comparator which has another negative input end forming a constant current control end and another positive input end connecting to the voltage source through a voltage dividing circuit and another output end connecting to the output end of the first comparator to output a constant voltage control signal; the another positive input end connecting to a first output end of the voltage dividing circuit which has a second output (input) end to output (input) a constant current control signal.

5. The switch mode power supply of claim 4, wherein the positive electrode of the diode is connected to the constant voltage control end of the constant current/voltage controller to form a constant voltage feedback circuit.

6. The switch mode power supply of claim 4, wherein the positive electrode of the diode is connected to the constant current control end of the constant current/voltage controller to form a constant current feedback circuit.

* * * * *